United States Patent
King (10) Patent No.: US 6,175,818 B1
(45) Date of Patent: Jan. 16, 2001

(54) SIGNAL VERIFICATION USING SIGNAL PROCESSING ARRANGEMENT FOR TIME VARYING BAND LIMITED INPUT SIGNAL

(75) Inventor: Reginald Alfred King, Shrivenham (GB)

(73) Assignee: Domain Dynamics Limited, Little Houghton (GB)

(*) Notice: Under 35 U.S.C. 154(b), the term of this patent shall be extended for 0 days.

(21) Appl. No.: 09/147,111

(22) PCT Filed: May 28, 1997

(86) PCT No.: PCT/GB97/01451

§ 371 Date: Dec. 11, 1998

§ 102(e) Date: Dec. 11, 1998

(87) PCT Pub. No.: WO97/45831

PCT Pub. Date: Dec. 4, 1997

(30) Foreign Application Priority Data

May 29, 1996 (GB) .................................................. 9611138

(51) Int. Cl.[7] .................................................. G10L 15/16
(52) U.S. Cl. ......................... 704/232; 704/202; 704/259; 704/211
(58) Field of Search ..................................... 704/246, 250, 704/259, 247, 202, 211, 231, 232, 239

(56) References Cited

U.S. PATENT DOCUMENTS

| | | | |
|---|---|---|---|
| 5,528,728 | * 6/1996 | Matsuura et al. | 704/232 |
| 5,621,848 | * 4/1997 | Wang | 704/211 |
| 5,687,286 | * 11/1997 | Bar-Yam | 704/232 |
| 5,689,616 | * 11/1997 | Li | 704/232 |
| 5,751,904 | * 5/1998 | Inazumi | 704/232 |
| 5,787,393 | * 7/1998 | Inazumi | 704/232 |
| 5,787,394 | * 7/1998 | Bahl et al. | 704/238 |
| 5,794,190 | * 8/1998 | Linggard et al. | 704/232 |
| 5,842,161 | * 11/1998 | Cohrs et al. | 704/251 |
| 5,903,863 | * 5/1999 | Wang | 704/231 |

OTHER PUBLICATIONS

Joubert et al.; Speech Recognition Using TES Symbols; Communications and Signal Processing; pp. 116–119, 1991.*

Timms et al.; Speaker Verification Routines for ISDN and UPT Access and Security Using Artificial Neural Networks and Time Encoding Speech (TES) Data; Second International Conferance on Private Switching Systems; pp. 59–64, 1992.*

Timms et al.; Speaker Verification Utilising Artificial Neural Networks and Biometric Functions Derived from Time Encoded Speech (TES) Data; Singapore ICCS/ISITA '92; 'Communications on the Move'; pp. 447–450, 1990.*

* cited by examiner

Primary Examiner—David R. Hudspeth
Assistant Examiner—Abul K. Azad
(74) Attorney, Agent, or Firm—Jacobson, Price, Holman & Stern, PLLC (57) ABSTRACT

A signal processing arrangement for a band-limited input signal, comprising a plurality N of signal comparators. Each signal comparator is adapted to compare the input signal with a plurality of different exemplar signals and to generate an output indicative of which of the exemplar signals corresponds most closely to the input signal. Each of the exemplar signals is arbitrarily derived independent of any expected input signal. The arrangement provides an N-part output signal which is indicative of the input signal, such that each part of the N-part output signal is derived from the output signal of a respective one of said N signal comparators.

14 Claims, 6 Drawing Sheets

FIG. 7 Registration

SIGNAL VERIFICATION USING SIGNAL PROCESSING ARRANGEMENT FOR TIME VARYING BAND LIMITED INPUT SIGNAL

BACKGROUND OF THE INVENTION

1. Field of the Invention

This invention relates to signal processing arrangements, and more particularly to such arrangements which are adapted for use with varying, e.g. time varying, band-limited input signals, such as speech.

2. Description of the Related Art

For a number of years the Time Encoding of speech and other time varying band-limited signals has been known, as a means for the economical coding of time varying signals into a plurality of Time Encoded Speech or Signal (TES) descriptors or symbols to afford a TES symbol stream, and for forming such a symbol stream into fixed dimensional, fixed size data matrices, where the dimensionality and size of the matrix is fixed, a priori, by design, irrespective of the duration of the input speech or other event to be recognised. See, for example:

1. U.K. Patent No. 2145864 and corresponding European Patent No. 0141497.
2. Article by J. Holbeche, R. D. Hughes, and R. A. King, "Time Encoded Speech (TES) descriptors as a symbol feature set for voice recognition systems", published in IEE Int. Conf. Speech Input/Output; Techniques and Applications, pages 310–315, London, March 1986.
3. Article by Martin George "A New Approach to Speaker Verification", published in "VOICE+", October 1995, Vol. 2, No. 8.
4. U.K. Patent No. 2268609 and corresponding International Application No. PCT/GB92/00285 (W092/00285).
5. Article by Martin George "Time for TESPAR" published in "CONDITION MONITOR", September 1995, No. 105.
6. Article by R. A. King "TESPAR/FANN An Effective New Capability for Voice Verification In The Defence Environment" published by the Royal Aeronautical Society, 4 Hamilton Place, London W1V OBQ, "The Role of Intelligent Systems in Defence", 27–28 March 1995.
7. Article by M. H. George and R. A. King "A Robust Speaker Verification Biometric". Proceedings IEE 29th Annual 1995 International Carnahan Conference on Security Technology. Pages 41–46, 18–20 October 1995.

The Time Encoding of speech and other signals described in the above references have, for convenience, been referred to as TESPAR coding, where TESPAR stands for Time Encoded Signal Processing and Recognition.

It should be appreciated that references in this document to Time Encoded Speech, or Time Encoded signals, or TES, are intended to indicate solely, the concepts and processes of Time Encoding, set out in the aforesaid references and not to any other processes.

In U.K. Patent No. 2145864 and in some of the other references already referred to, it is described in detail how a speech waveform, which may typically be an individual word or a group of words, may be coded using time encoded speech (TES) coding, in the form of a stream of TES symbols, and also how the symbol stream may be coded in the form of, for example, an "A" matrix, which is of fixed size regardless of the length of the speech waveform.

As has already been mentioned and as is described in others of the references referred to, it has been appreciated that the principle of TES coding is applicable to any time varying band-limited signal ranging from seismic signals with frequencies and bandwidths of fractions of a Hertz, to radio frequency signals in the gigaHertz region and beyond. One particularly important application is in the evaluation of acoustic and vibrational emissions from rotating machinery.

In the references referred to it has been shown that time varying input signals may be represented in TESPAR matrix form where the matrix may typically be one dimensional or two dimensional. For the purposes of this disclosure two dimensional or "A" matrices will be used but the processes are identical with "N" dimensional matrices where "N" may be any number greater than 1, and typically between 1 and 3. It has also been shown how numbers of "A" matrices purporting to represent a particular word, or person, or condition, may be grouped together simply to form archetypes, that is to say archetype matrices, such that those events which are consistent in the set are enhanced and those which are inconsistent and variable, are reduced in significance. It is then possible to compare an "A" matrix derived from an input signal being investigated with the archetype matrices in order to provide an indication of the identification or verification of the input signal. In this respect see U.K. Patent No. 2268609 (Reference 4) in which the comparison of the input matrix with the archetype matrices is carried out using fast artificial neural networks (FANNS).

It will be appreciated, as is explained in the prior art, for time varying waveforms especially, this process is several orders of magnitude simpler and more effective than similar processes deployed utilising conventional procedures and frequency domain data sets.

It has now been appreciated that the performance of TESPAR and TESPAR/FANN recognition, classification, verification and discrimination systems can, nevertheless, be further significantly improved.

The invention to be disclosed will use as its example architecture TESPAR/FANN data sets and networks, but it will be appreciated by those skilled in the art that the invention may equally be applied to data sets other than TESPAR.

BRIEF SUMMARY OF THE INVENTION

According to the present invention there is provided a signal processing arrangement for a varying band-limited input signal, comprising a plurality N of signal comparators, each signal comparator being adapted to compare said input signal with a plurality of different exemplar signals and for affording an output indicative of which of said exemplar signals corresponds most closely to said input signal, characterised in that each of the exemplar signals of said signal comparators is arbitrarily derived indepently of any expected input signal, and by means for deriving an N-part output signal which is indicative of said input signal, each part of said N-part output signal being derived from the output signal of a respective one of said N signal comparators.

In a preferred arrangement in accordance with the present invention each of said signal comparators is based on TESPAR coding.

In carrying out the invention each of said signal comparators comprises coding means operable on said input signal for affording a time encoded signal symbol stream, means operable on said symbol stream for deriving matrix dependent signals corresponding to a fixed size matrix formable from said symbol stream, and artificial neural network processing means responsive to said matrix dependent signals for affording an output indicative of said input signal.

In an especially preferred arrangement for speech input signals it will be arranged that means is provided for storing said output signal on a magnetic stripe card, a smart card or on a plastic card e.g. using a bar code.

In carrying out the invention it may be arranged that said especially preferred arrangement comprises means for detecting an input speech signal, means for applying said detected input speech signal to said plurality of signal comparators to derive said N-part output signal, card reader means for detecting an output signal stored on said card, and means for comparing the N-part output signal derived from said input speech signal with the output signal derived from said card to afford an output indicative of whether they correspond or not.

Advantageously, it may be arranged that each of said signal comparators is effective for comparing said input signal with eight exemplar signals whereby said output signal comprises N, three bit words.

BRIEF DESCRIPTION OF THE DRAWINGS

An exemplary embodiment of the invention will now be described reference being made to the accompanying drawings, in which.

DETAILED DESCRIPTION OF THE INVENTION

By the methods described in the prior art referred to above, multiple sets of TESPAR/FANN networks may be trained to identify one person from a multiplicity of persons, or a spoken word from a multiplicity of spoken words, or a particular waveform from a multiplicity of similar waveforms, using examples, conveniently referred to as "competitors", of the "target" individual word or waveform, to train a fast artificial neural network (FANN), to classify the target individual, word or waveform against differing example sets of competitor individuals, words or waveforms.

Figure 1:
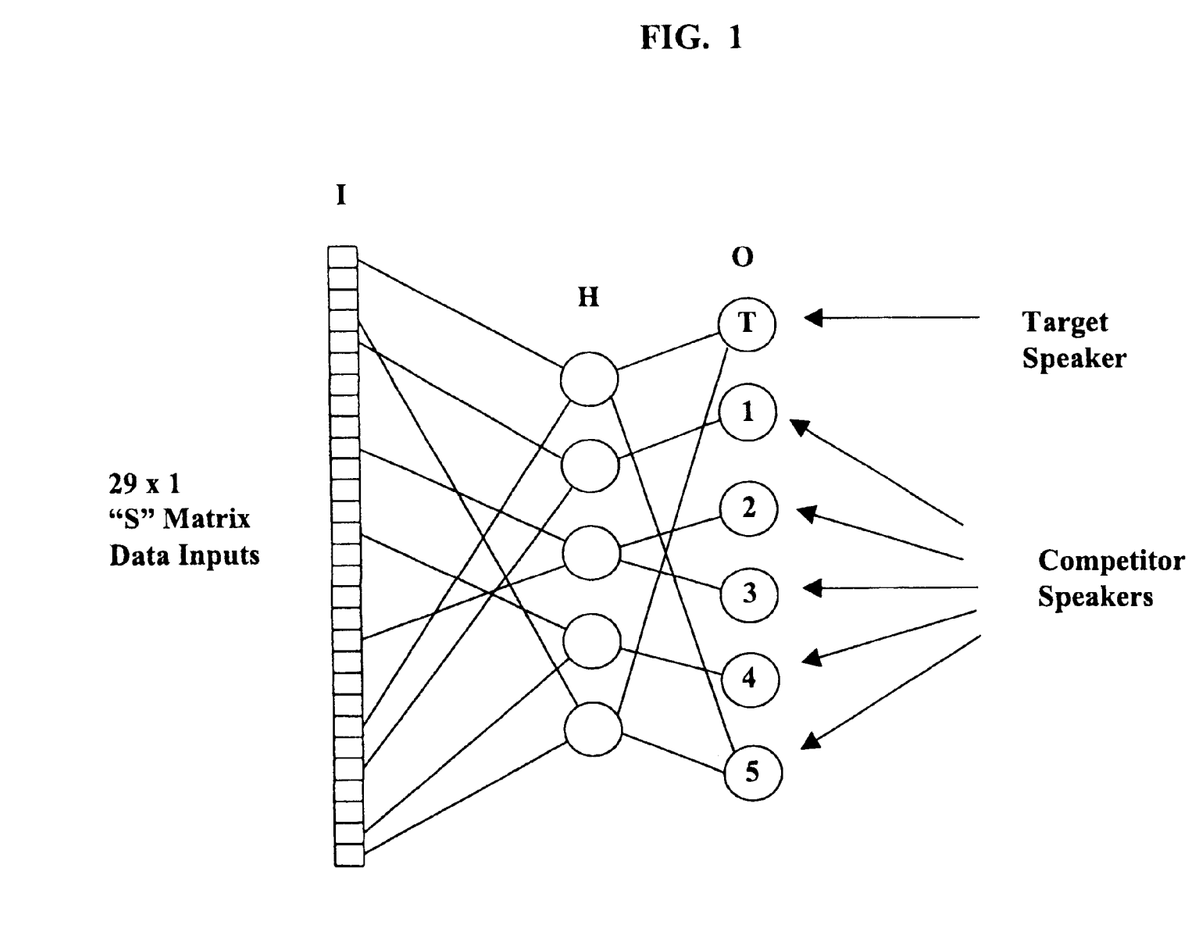
FIG. 1, depicts a typical prior art TESPAR/FANN network configuration of the kind described in References 6 and 7 referred to above.

A typical prior art single TESPAR/FANN network configuration is shown in FIG. 1. For simplicity, only a few of the total interconnections between the various elements of the FANN are shown, it being understood by those skilled in the art that, in general, the network would be fully interconnected. In this diagram, "I" indicates the Input layer of the FANN, "H" indicates the Hidden layer of the FANN, and "O" indicates the Output layer. "T" indicates the Target speaker output, and the remaining outputs numbered 1 to 5 indicate the outputs associated with the five competitor speakers.

This example shows a 29 symbol TESPAR "S" Niatrix set as the input data of the FANN, five elements in the hidden layer of the FANN, and six elements in the output layer of the FANN. Other combinations such as 29×29 symbol TESPAR "A" Matrices or other representative data may be used with hidden and output layers of varying numbers.

Given the FANN architecture above it will be appreciated that, once trained, a network may be defined by reference, in order, to the interconnecting weights after such training. It has been found that for many applications a resolution of 16 bits of data per interconnection is adequate to describe the network, this is to say 2 (8 bit) bytes per interconnection, plus a few additional bytes for network definition and housekeeping. Thus the network shown above could, after training, be described/defined by 29×5×2 bytes plus 5×6×2 bytes =350 bytes plus housekeeping, say a total of approximately 400 bytes of data.

It will be appreciated by those skilled in the art that if the input data sets were to be reduced in size by, e.g. Principal Component Analysis (PCA) to say 12 principal components from 29 data inputs, then the defining data set would be reduced from circa 400 bytes to 12×5×2 plus 5×6×2=180 bytes plus housekeeping=approximately 200 bytes.

Thus by these means a single FANN trained to verify a single target speaker against 5 competitor speakers could be defined/described and stored in about 200 bytes. By this means, 5 such nets in parallel combination as described in the references above, could be deployed to improve the classification performance of a single net TESPAR FANN classification system used for example in a speaker verification configuration, at the expense of increasing the digital data required to characterise the network set, from 200 bytes to 1000 bytes.

Figure 2:
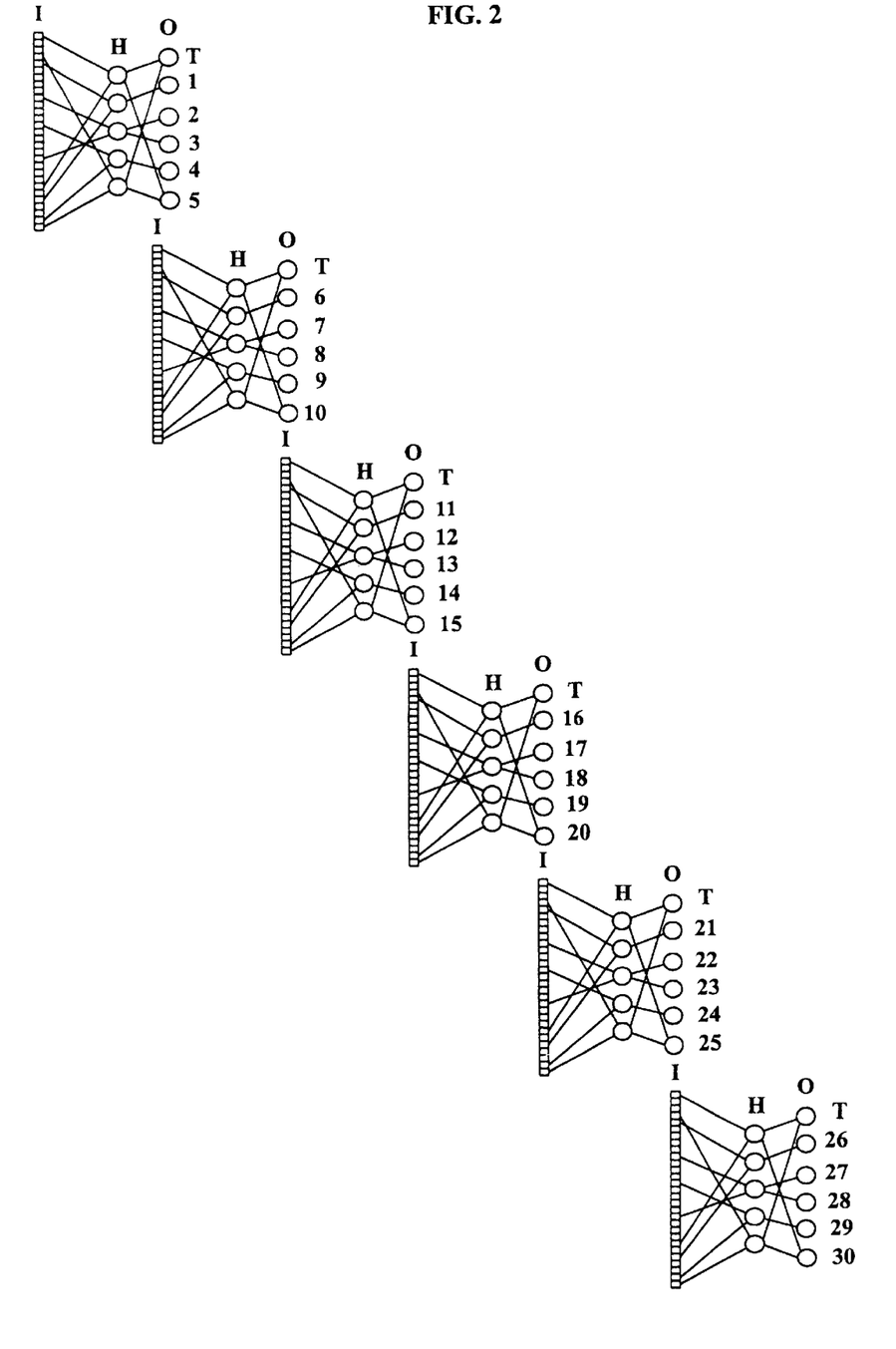
FIG. 2, depicts a typical prior art six network configuration of the kind described in References 6 and 7 referred to above.

It will be appreciated by those skilled in the art that the greater the number of networks deployed in parallel with different combinations of competitor speakers, and decision logic based on data fusion algorithms, the lower the false reject rate (FRR) and false accept rate ((FAR) of the overall system would be. This is described in the references above which illustrate 15 parallel networks being deployed. FIG. 2 shows a typical prior art 6 network combination, where outputs 1 to 30 indicate arbitrary additional competitor speakers.

By the numerical yardstick described above, 15×200 bytes =3K bytes of digital data would be needed to store the digital information to enable a classification/verification to take place in real time, based on 15 such parallel networks.

The training of such network sets, which sets are unique to each speaker, represents, for a large population of speakers, a significant requirement in terms of computer time and administrative overhead. It also represents a cata set for each speaker which is significantly larger than can be accommodated in a simple magnetic stripe card, or a plastic card which incorporates, for example, a bar code, although a data set of this size may not be excessive for a "Smart" card which may include for example a microprocessor.

It will also be appreciated that, if more informative (29×29) "A" Matrices were to be used as input data, in the creation of the neural networks, then the data set required to define the trained network would be increased in size approximately by a factor of 29. Such an increase would be significantly productive from the performance point of view, because "A" matrices are much more informative data sets. Such an increase would however be counter-productive from a data storage point of view especially for applications using magnetic stripe cards and too, for applications where the acoustic background noise and variation, and or the channel noise and variation dictated a requirement for the use of a much larger number of parallel networks to compensate for these variations. Using TESPAR/FANN in the manner described in the references above results in data requirements much smaller than competitor systems by factors of between 10 and 100, such that verifications may be achieved very efficiently and with very low error rates for, for example, smart cards. For magnetic stripe cards or bar coded plastic cards, however, where the total data set available may be limited to perhaps 50 or 60×8 bit bytes, very low error rates are almost impossible to achieve by these means, even using TESPAR/FANN data sets and procedures.

Figure 3:
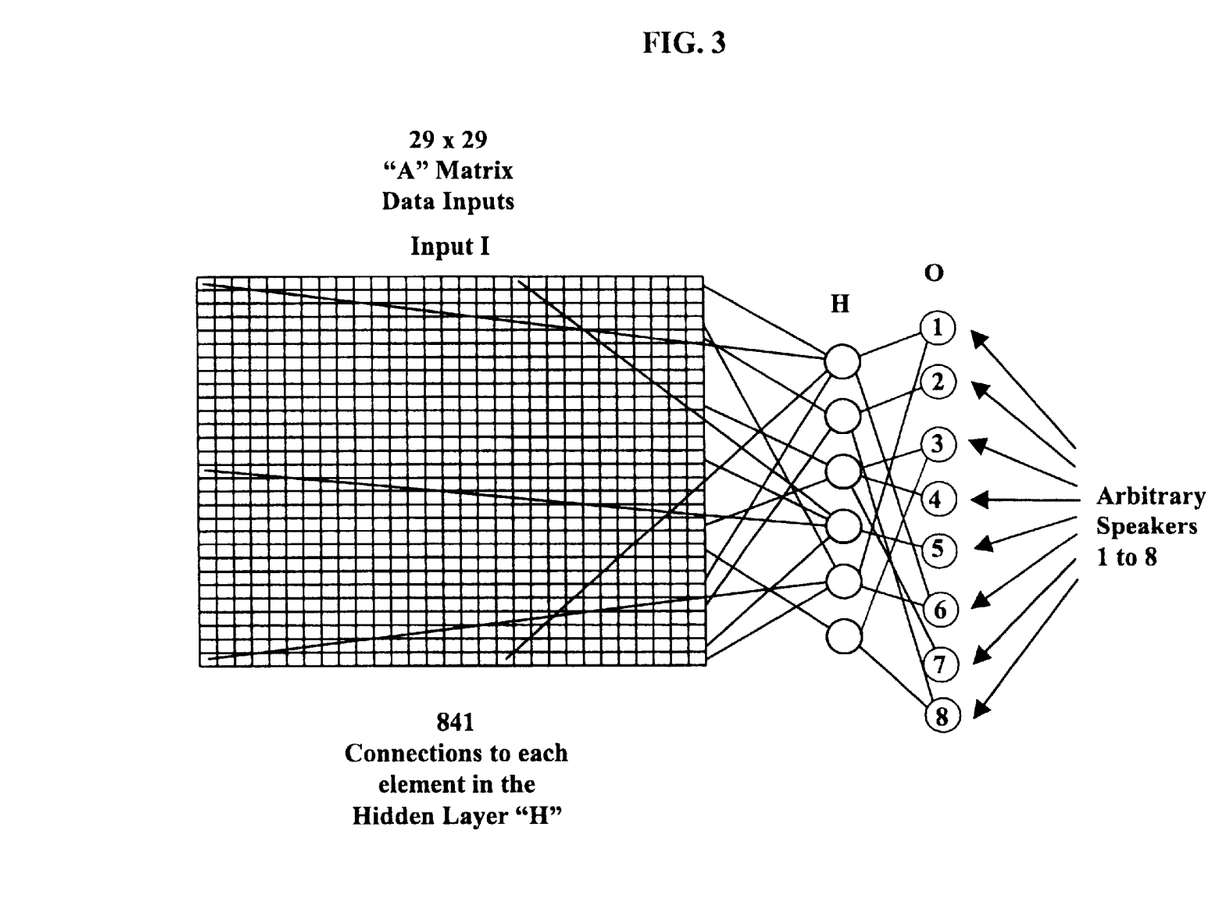
FIG. 3, depicts a TESPAR/FANN network configuration in accordance with the present invention using an "A" matrix data input for eight arbitrary speakers.

It has now been discovered that an alternative method may be used to advantage to overcome the difficulties described above, and to capitalise upon the strengths of the multiple network architecture described in the references and above, without requiring the significant training procedures presently required and, surprisingly, to contain all the information required in as little as 50 or 60×8 bit bytes of data irrespective of the size or dimensionality and complexity of the input data matrices and trained networks derived from such data, whilst, at the same time utilising the immense power of multiple parallel networks and data fusion enhancements to achieve performance associated with, for example between 100 and 1500 networks. In the process according to the invention now to be disclosed by way of example, sets of TESPAR/FANN networks are trained a priori with the speech input from a number of arbitrary "exemplar" speakers, using "A" or "S" or "3" or higher dimensional matrices as input data to Fast Artificial Neural Networks with varying numbers of elements in the hidden layer and, for example, 8 elements in the output layer. That is to say in the case of speaker verification 8 different arbitrary exemplar" speakers being used as training inputs for a FANN to be classified and to form an 8 element output layer of a single FANN network. See for example FIG. 3, where "A" matrix data inputs are shown in a TESPAR/FANN with 6 bytes =350 bytes elements in the hidden layer and 8 elements in the output layer.

For example, an ordered set of "N" such networks, all different, may be generated a priori, in non real time, where N may typically be of the order of say 50 to 500 networks created using "A" matrices. In this example "A" matrices are exemplified but other TESPAR matrices may be used to advantage. Although TESPAR data is used here to exemplify the processes, other data sets representative of the speakers utterances, for instance, spectral plots or any other data sets not limited to TESPAR may be used as input data.

Having trained "N" such networks and stored these in a specific set ordered fashion, these are then used as an interrogation set, against which all speakers are to be compared, both in registration and subsequent interrogation. By way of example FIG. 4 indicates the first five nets of, say, a 100 net interrogation set of such networks, each with 8 outputs.

Figure 4:
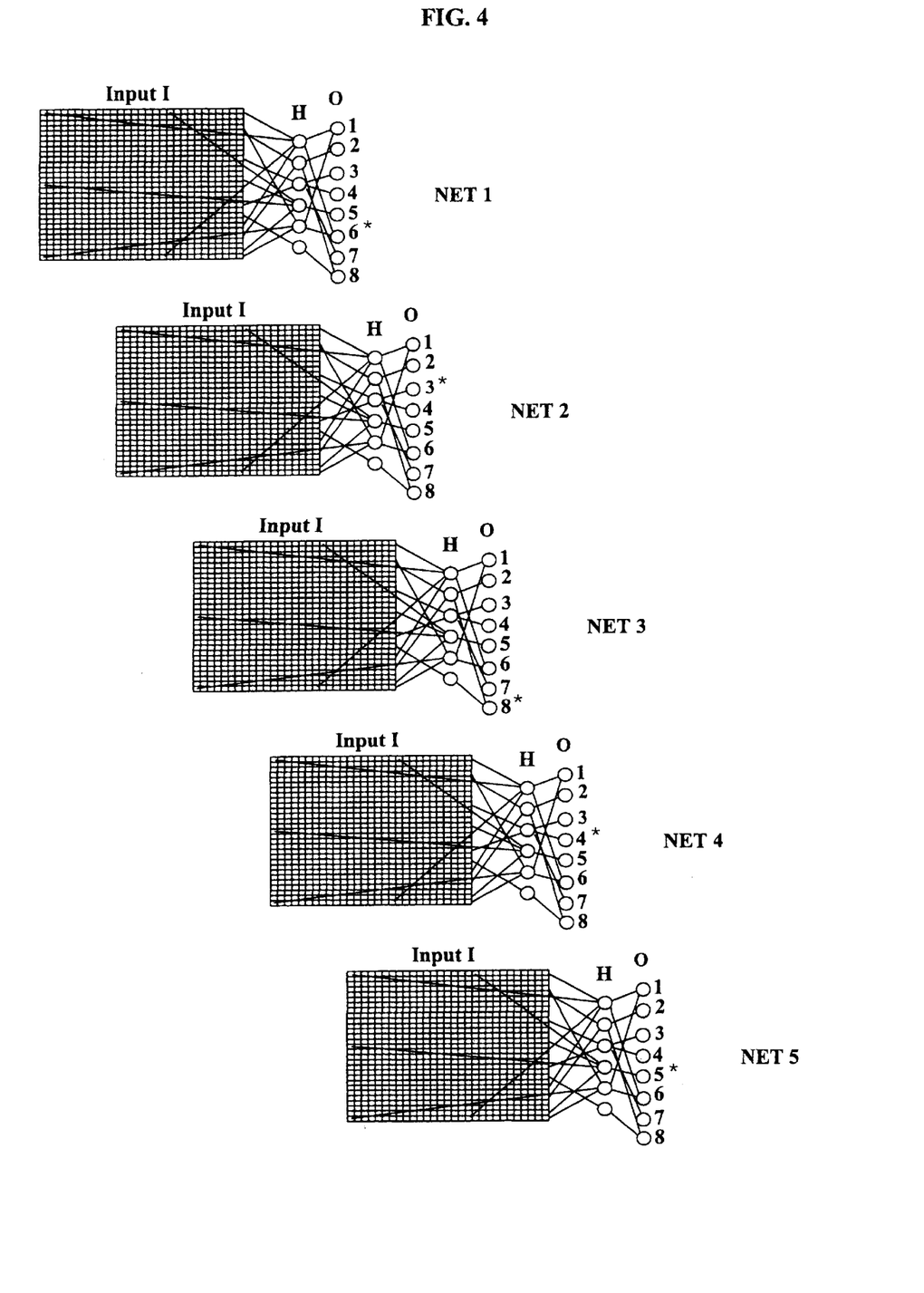
FIG. 4, depicts the first 5 of 100 TESPAR/FANN networks as shown in FIG. 3.

By this means, when a speaker registers against the 100 net interrogation set of networks, his/her utterances will be converted to "A" matrices and compared against each of the 100 nets, in turn, in order. Each net will produce an output on one of its 8 output nodes, indicating to which of the 8 "exemplar" speakers in the net, the input utterance was closest. This process is repeated across the 100 nets, to provide a data set indicative of the comparative characteristics of the speaker who is registering, against the sets of "exemplar" speakers who have already trained the networks.

Thus, for example, for Net 1, output 6 may be the closest match, for Net 2, output 3 may be the closest, for Net 3, output 8, for Net 4, output 4 and for net 5, output 7 and so on for the complete set of 100 Net comparisons. In FIG. 4 these 5 outputs have been indicated by a * sign. By this means, and for this example, the speaker being registered may be characterised by an ordered set of 100, 3 bit words, i.e. one 3 bit word for each of the 8 outputs of 100 nets. It will be appreciated that such a characterisation has in this example, been carried out in 100×3 bits, i.e. 300 bits which equals 300/8=circa 38×8 bit bytes which data set may easily be accommodated on a magnetic stripe card. Thus, having registered in this manner, using TESPAR Matrices, or TESPAR Archetypes, (or other differently derived data sets) the numerical profile or digital identity of the registered user may be stored on his/her card in these 38 bytes of data. These data describe the numerical output profile likely (to a very high probability) to be generated by the registered users voice input, when subsequently compared, during interrogation, against the 100 nets previously created.

Thus, on wishing to use the card, the card is passed into the card reader where the 38 Byte descriptor is read off its magnetic stripe. The user then inputs his/her acoustic input utterance, and an appropriate "A" matrix is created. This is used to interrogate the set of 100 standard networks and a comparison of the digital output of the 100 nets is made, against the data set recorded on the card. A close match indicates the likelihood that the input utterance was generated by the rightful user who registered the card prior to issue.

It is well known that, for example, speech utterances may vary significantly when spoken over communication channels, or when individuals are stressed, or in varyina noise conditions, or when differing microphones or transducers are deployed in a system, etc. Using the methodology described in the current disclosure, the effects of these counter-productive mutilations may be minimised by arranging for the input training data sets to be duplicated with for example, various typical noise files added to them and/or duplicated with pitch shifts, both positive and negative, and or duplicated with any data transformation which replicates the conditions likely to be encountered during a realistic operation of the system. Given these data, typical of the conditions likely to be encountered by the system, the numerical output profiles resulting from each set during registration may be fused to indicate those most likely to be consistent over any specified background, input transducer, channel, . . . etc., variability/mutilation. In the simplest example the numerical output profile utilised may consist of the sub-set of numbers which are consistent across all sets of mutilations. This very simple example is given by way of example only. It will be appreciated that a wide variety of mathematical data fusion strategies may be applied to advantage on the data sets so derived, dependent upon the system and operational and commercial requirements. It will also be appreciated that this strategy may be applied to advantage to waveforms other than speech.

It will be appreciated that a variety of mathematical numerical distance measures may be deployed to indicate similarity between the input data generated and the data set stored on the card. In many embodiments, up to three or more attempts may be permitted, before the card user is rejected. In this case input TESPAR data matrices may be progressively archetyped as indicated in the references, to provide stability and flexibility in the input data, prior to the specified comparison routines. It will also be obvious that although this disclosure is described in relation to magnetic swipe cards, other portable digital or analog store configurations, such as for instance, "smart" cards or plastic cards incorporating a bar code, or small digital keys may be used. The data descriptors described may be used with any digital store, but are especially valuable where digital data stores are constrained operationally, or for commercial reasons to be very small in capacity.

It is well known that interrogation of FANNS may be carried out virtually instantaneously, as compared with the time delays involved in conventional FANN training, which is relatively time consuming, so the overheads associated with conventional training routines may be substantially reduced to advantage by this means.

Figure 5:
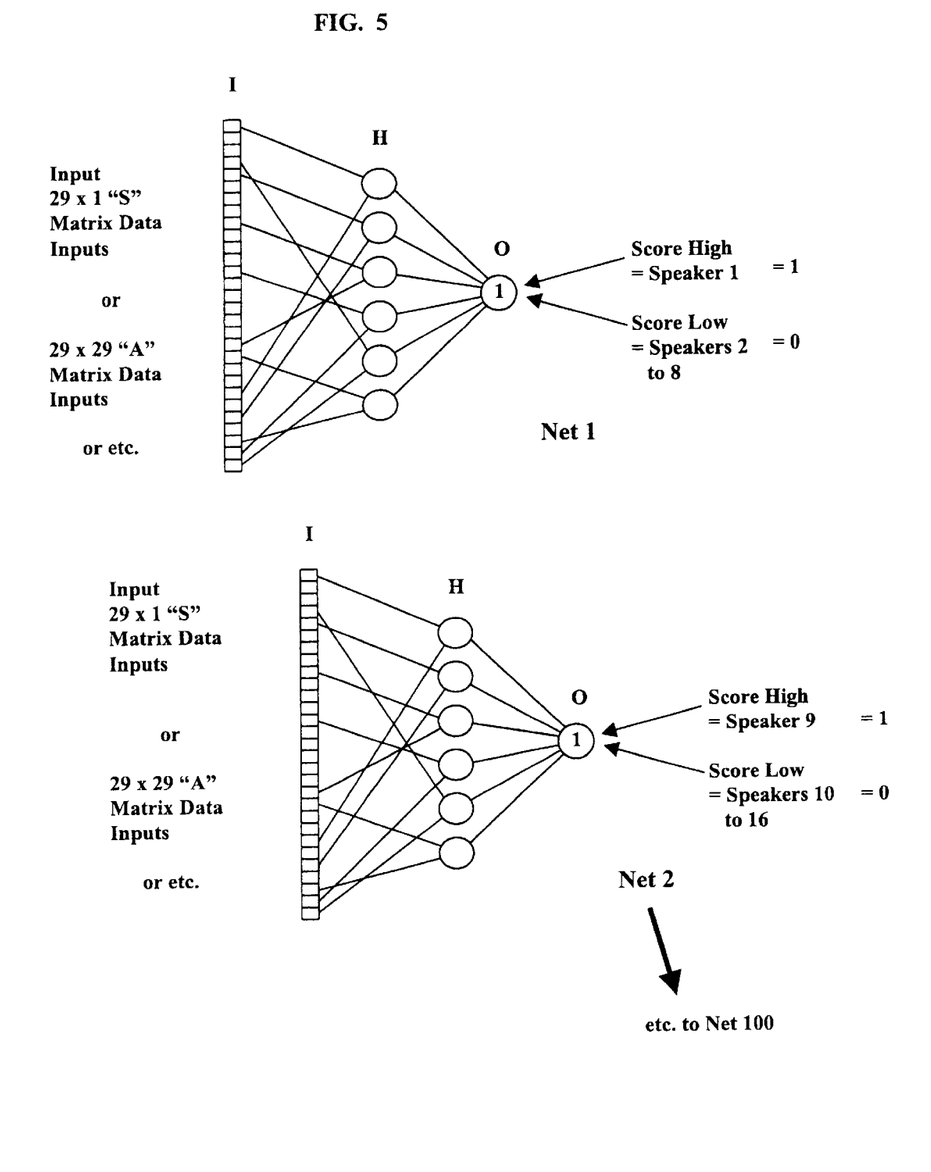
FIG. 5, depicts 2 simplified TESPAR/FANN network configurations in accordance with the present invention.

It has further been discovered that the multiple FANN architecture described above may be simplified further to advantage, by, for example, combining the outputs of the individual FANNS e.g. combining the 8 elements of the output layer of the FANNs, to simplify the network decision structure, and enable many more sets of networks to be deployed for classification. For example, an 8 output network may be simplified to a 1 output network, where one of the "exemplar" speakers of the net may be constrained during training to output high (close to 1), whilst the remaining 7 "exemplar" speakers may all be constrained to read low (close to 0). See for example FIG. 5. By this means the output of each net may be described in one bit of information, so the output of 100 nets may thus be described by 100 bits =13 Bytes of digital data. By way of example FIG. 5 indicates the first 2 nets of, say, a 100 net interrogation set of such networks, each trained with 8 different speakers but with 1 output, "High" indicating Speaker 1 (from the 8), and output 1 "Low" indicating any of the remaining 7 speakers of the 8.

It will be appreciated that combinations of multiple output nets and TESPAR/FANN architectures may be used to advantage to tailor individual systems to individual commercial and operational requirements. Further, as indicated in the references, the verification, recognition and classification procedures described encompass applications in many diverse fields such as condition monitoring, word spotting, ... medical and other waveform analysis, and any other application where recognition and classification of waveforms is required.

Figure 6:
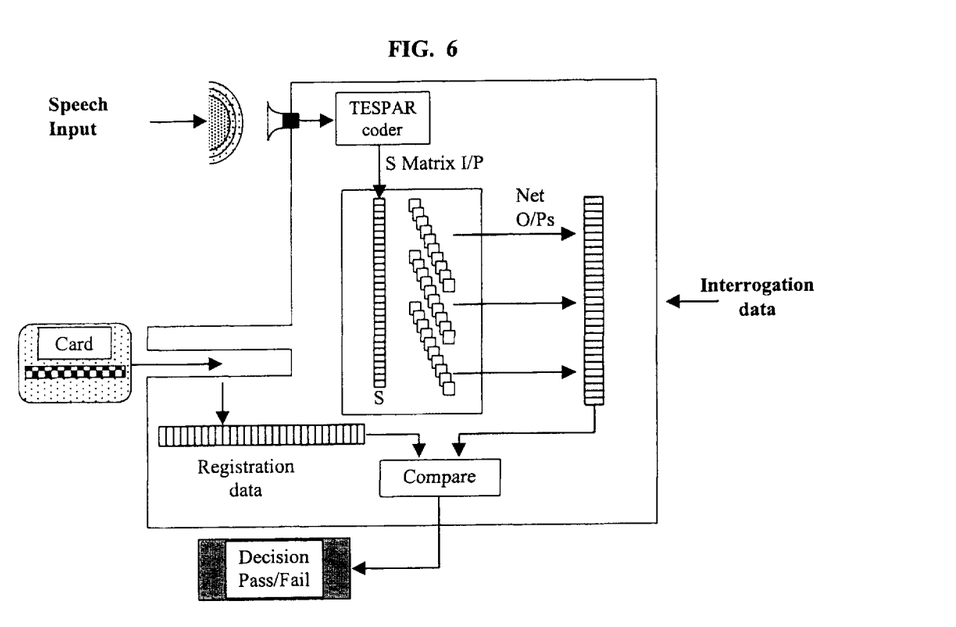
FIG. 6, depicts a typical speaker verification system in accordance with the present invention.

FIG. 6 shows the outline characteristics of a typical Verification system utilising a magnetic stripe swipe card with a data profile stored on it. In operation, this profile is transferred to the card reader. The user then inputs his/her speech input. This is converted into an appropriate TESPAR matrix which is then used to interrogate the (100) multiple FANNS, to produce a digital output indicative of the identity of the speaker. This digital output is compared with that transferred from the card and the user is accepted or rejected accordingly.

Figure 7:
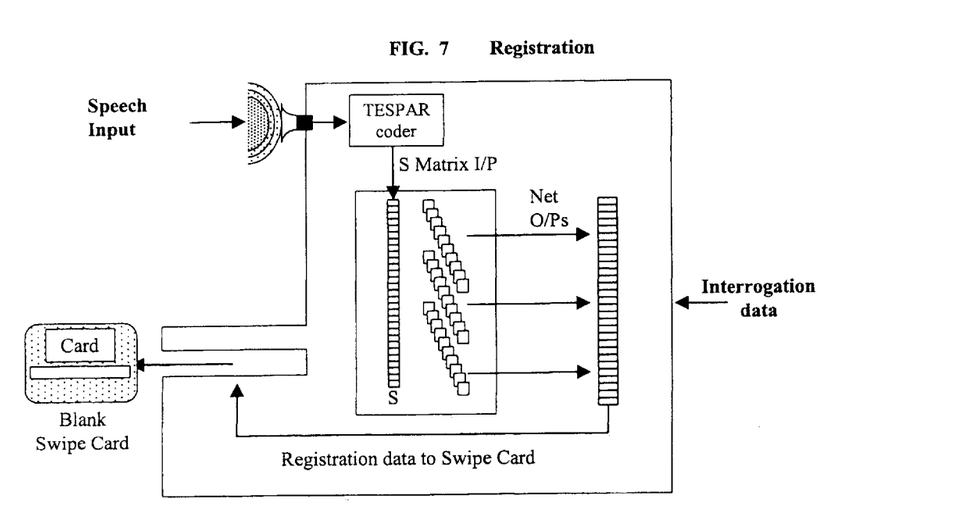
FIG. 7, depicts a typical speaker registration system in accordance with the present invention.

FIG. 7 shows the outline characteristics of a typical Registration procedure. During registration, the appropriate speech utterances are input to the TESPAR coder and, for example, "S" matrices or "S" archetypes are produced. These are then used to interrogate the previously created (e.g. 100) nets, in order. The net outputs may then be manipulated as described above (and stored centrally, if required) and passed to a swipe card write mechanism, to fix the registration data on to the card. It will be appreciated that a variety of encryption algorithms may be used to add further protection to these data transfer and storage processes.

What is claimed is:

1. A signal processing arrangement for a time varying band-limited input signal, comprising a plurality N of signal comparators (Net 1–Net 5), each signal comparator being adapted to compare said input signal with a plurality of different exemplar signals (1–8) and for affording an output (*) indicative of which of said exemplar signals corresponds most closely to said input signal, characterised in that each of the examplar signals (1–8) of said signal comparators (Net 1–Net 5) is arbitrarily derived independently of any expected input signal, and by means for deriving an N-part output signal which is indicative of said input signal, each part of said N-part output signal being derived from the output signal of a respective one of said N signal comparators (Net 1–Net 5), the said signal comparators being based on a coding method using time encoded waveform shape descriptors.

2. The arrangement as claimed in claim 1, in which each of said signal comparators is based on TESPAR coding.

3. The arrangement as claimed in claim 2, in which each of said signal comparators comprises coding means operable on said input signal for affording a time encoded signal symbol stream, means operable on said symbol stream for deriving matrix dependent signals corresponding to a fixed size matrix formable from said symbol stream, and artificial neural network processing means responsive to said matrix dependent signals for affording an output indicative of said input signal.

4. The arrangement as claimed in claim 1, in which said input signal is a speech input signal.

5. The arrangement as claimed in claim 1, comprising means for storing said output signal on a magnetic stripe card.

6. The arrangement as claimed in claims 5, comprising means for detecting an input speech signal, means for applying said detected input speech signal to said plurality of signal comparators to derive said N-part output signal, card reader means for detecting an output signal stored on said card, and means for comparing the N-part output signal derived from said input speech signal with the output signal derived from said card to afford an output indicative of whether they correspond or not.

7. The arrangement as claimed in claim 6, in which each of said signal comparators is effective for comparing said input signal with eight exemplar signals whereby said output signal comprises N, three bit words.

8. The arrangement as claimed in claim 1, comprising means for storing said output signal on a smart card.

9. The arrangement as claimed in claims 1, comprising means for storing said output on a plastic card.

10. The signal processing arrangement according to claim 1, wherein said arrangement further comprises:
storage means configured to store an N-part registration output signal; and
comparison means for comparing said N-part output signal with said N-part registration output signal and for providing an output indicative of whether they correspond or not.

11. A method for signal processing a time varying band-limited input signal, comprising the steps of:
receiving a time varying band-limited input signal;
encoding said input signal using TESPAR coding to generate an input signal code;
comparing said input signal code with each of N comparison sets of exemplar signal codes, each of said N comparison sets comprising a plurality of different exemplar signal codes; and generating an output for each respective comparison set, each output being indicative of which exemplar signal code within its respective comparison set corresponds most closely to said input signal code, characterized in that each of said exemplar signal codes is arbitrarily derived independently of any expected input signal, and by deriving an N-part output signal which is indicative of said input signal, each part of said N-part output signal being derived from a respective one of said outputs.

12. The method for signal processing according to claim 11, wherein said encoding comprises the steps:

encoding said input signal to generate a time encoded signal symbol stream;

generating a fixed size matrix from said signal symbol stream; and deriving said input signal code form said fixed size matrix.

13. The method for signal processing according to claim 11, including the steps of reading a stored output signal;

comparing said stored output signal with said N-part output signal; and generating an output indicative of whether said stored output signal and said N-part output signal correspond or not.

14. The method for signal processing according to claim 13, wherein said stored output signal is a stored N-part output signal.

* * * * *